United States Patent [19]

Reis

[11] 4,193,054
[45] Mar. 11, 1980

[54] AIR FLOW TRANSDUCER

[75] Inventor: Robert D. Reis, Hingham, Mass.

[73] Assignee: United Electric Controls Company, Watertown, Mass.

[21] Appl. No.: 895,261

[22] Filed: Apr. 10, 1978

[51] Int. Cl.² ........................................... H01L 10/10
[52] U.S. Cl. .................................... 338/42; 73/205 L
[58] Field of Search ...................... 338/42, 36; 73/211, 73/205 L, 202; 138/42

[56] References Cited

U.S. PATENT DOCUMENTS

| | | | |
|---|---|---|---|
| 2,306,940 | 12/1942 | Fischer | 73/211 |
| 2,502,559 | 4/1950 | Coxon | 338/42 |
| 3,283,283 | 11/1966 | Denner et al. | 338/36 X |
| 3,789,880 | 2/1974 | Armstrong et al. | 138/42 X |
| 3,838,598 | 10/1974 | Tompkins | 73/211 X |

Primary Examiner—C. L. Albritton
Attorney, Agent, or Firm—Dike, Bronstein, Roberts, Cushman & Pfund

[57] ABSTRACT

An air flow transducer wherein the displacement of a diaphragm by a pressure differential at the opposite sides thereof is measured in terms of unit electrical resistance. The pressure differential is provided by supplying the air to the transducer through ports, one of which is in communication with one side of the diaphragm and the other of which is in communication with the opposite side of the diaphragm, and by providing a linear flow restrictor in the latter port which resists air flow in direct proportion to any increase in the air flow to thus produce a pressure drop from one side of the diaphragm to the other which is directly proportional to the increase in flow.

27 Claims, 11 Drawing Figures

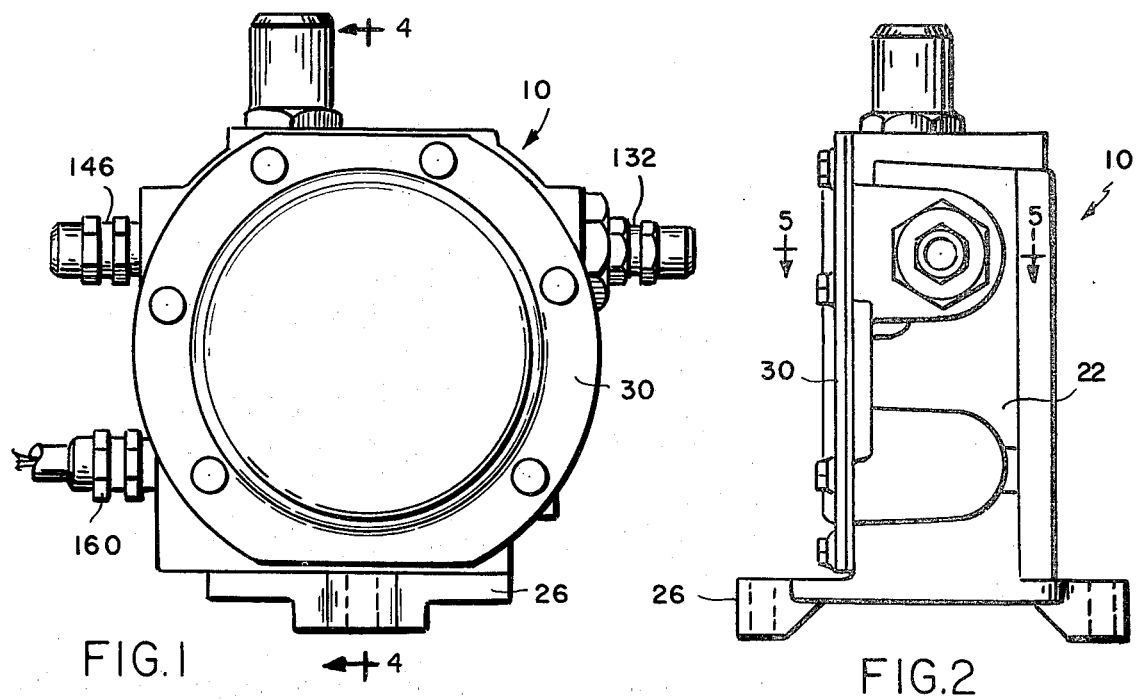
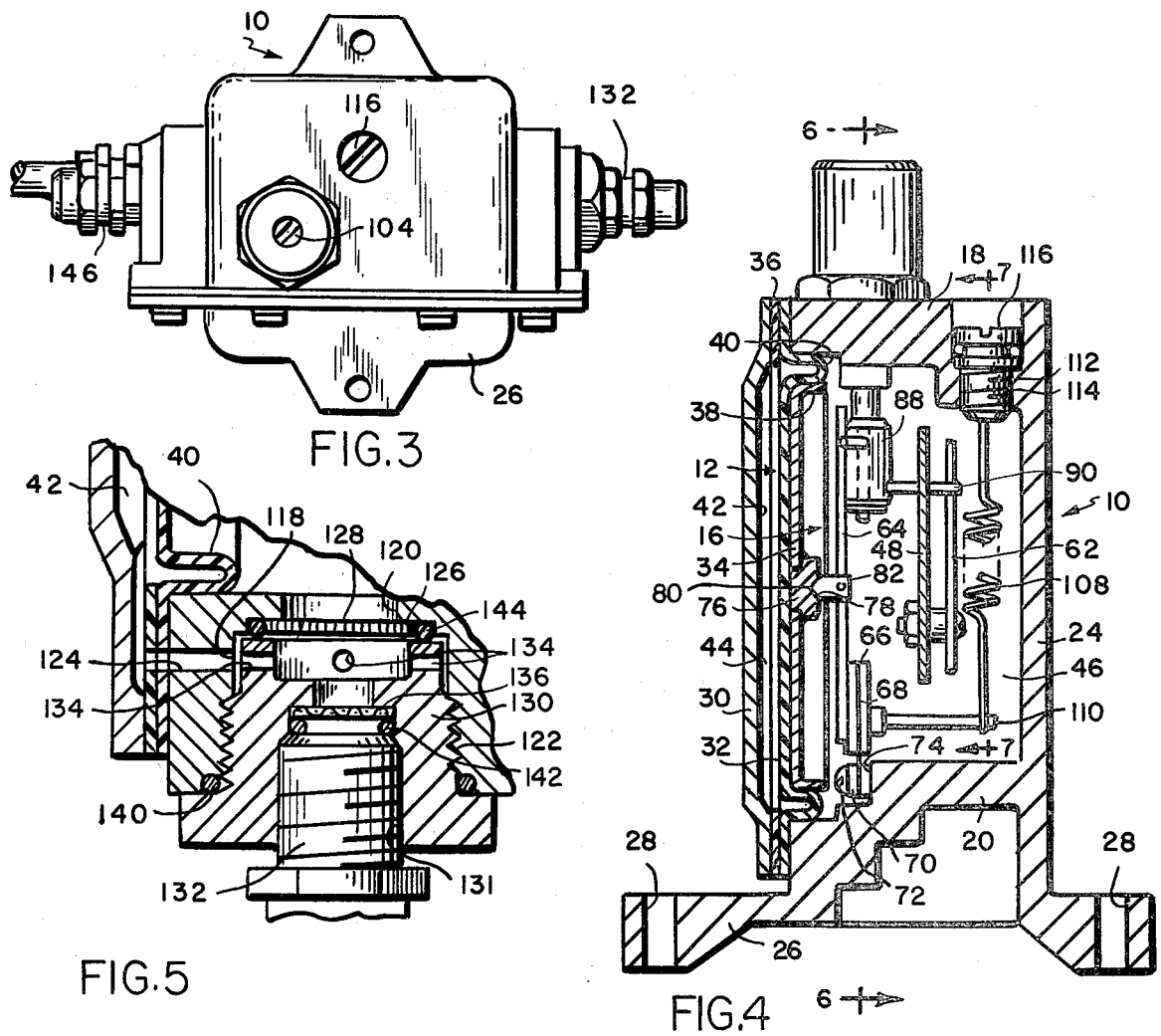

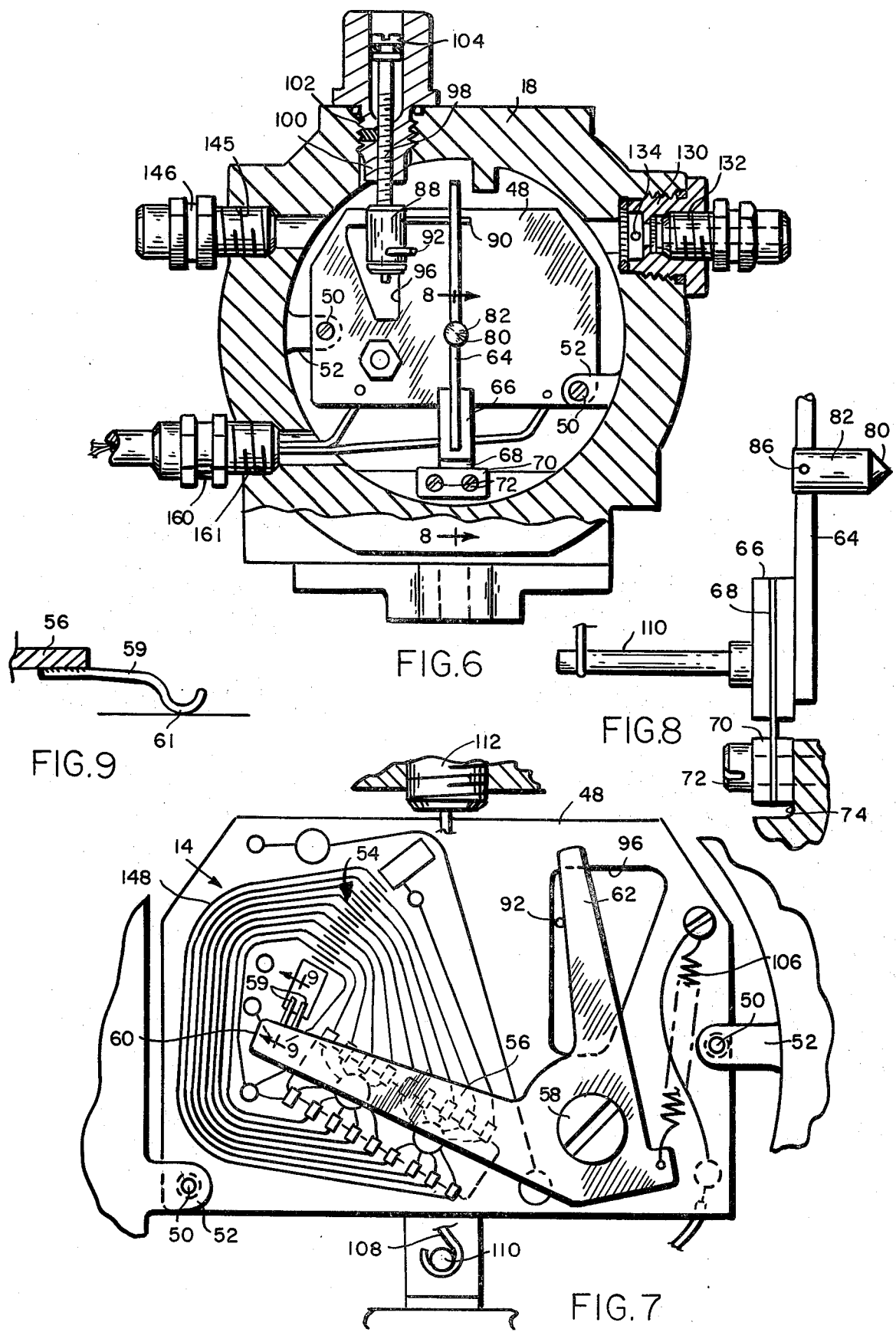

AIR FLOW TRANSDUCER

BACKGROUND OF INVENTION

There are many kinds of instruments designed to affect and correct conditions in pressurized telephone cable systems. The specific advantages of the transducer herein illustrated lie in improved sensitivy achieved through the simplicity of design, minimal mechanism, minimal inertia of moving parts, and maintenance of a constant loading force throughout the range of adjustment.

SUMMARY OF INVENTION

An air flow transducer comprising high and low pressure chambers with a displaceable member therebetween, means defining ports, one of which is in communication with the high pressure chamber and the other with the low pressure chamber, means situated within the latter port which increasingly resists flow through it in direct proportion to an increase in flow to thus produce a pressure differential in the chambers such as to effect displacement of the displaceable means in direct proportion to the increase in flow and means operable by the displacement of the displaceable member to denote the change in air flow in terms of electrical resistance. The means situated in the port in communication with the low pressure chamber is a linear flow restrictor and, in its preferred form, comprises sintered stainless steel powdered metal selected to provide a predetermined pressure drop. The displaceable member is a diaphragm which divides one chamber from the other. A printed circuit embodying a plurality of unit resistances arranged to be added to or removed from the circuit by movement of a contact arm along the bank of terminals is supported in the low pressure chamber and there is kinematic means connecting the diaphragm with the contact arm in such a way as to effect its movement along the bank of terminals in response to displacement of the diaphragm. The said kinematic means comprises a lever flexibly supported at one end in a generally parallel, diametrical relation to the diaphragm, means at the center of the diaphragm engaged with the lever intermediate its ends and angularly disposed arms adjacent the distal end of the lever supported for rotation in unison about an axis parallel to the lever with one arm in engagement with the distal end of the lever and the other with an actuator at the proximal end of the contact arm. The support for the angularly arranged arms is adjustable axially of its axis of rotation to change the position of engagement of the one arm with the lever and the other with the actuator and thus to adjust the span. A spring holds the actuator in engagement with its actuating arm. Zero adjustment is provided for by a spring which resists displacement of the lever and there is means for adjusting the latter spring to resist such displacement. Thus, the span and zero adjustments are independent.

The invention will now be described in greater detail with reference to the accompanying drawings, wherein:

FIG. 1 is an elevation as seen from one side of the transducer;

FIG. 2 is an elevation as seen from the right side of FIG. 1;

FIG. 3 is a plan view as seen from the top of FIG. 1;

FIG. 4 is a section taken on the line 4—4 of FIG. 1;

FIG. 5 is a fragmentary horizontal section taken on the line 5—5 of FIG. 2;

FIG. 6 is a section taken on the line 6—6 of FIG. 4;

FIG. 7 is a section taken on the line 7—7 of FIG. 4;

FIG. 8 is an enlarged fragmentary elevation of the diaphragm-actuated lever taken on the line 8—8 of FIG. 6;

FIG. 9 is a section taken on the line 9—9 of FIG. 7;

Figure 10:
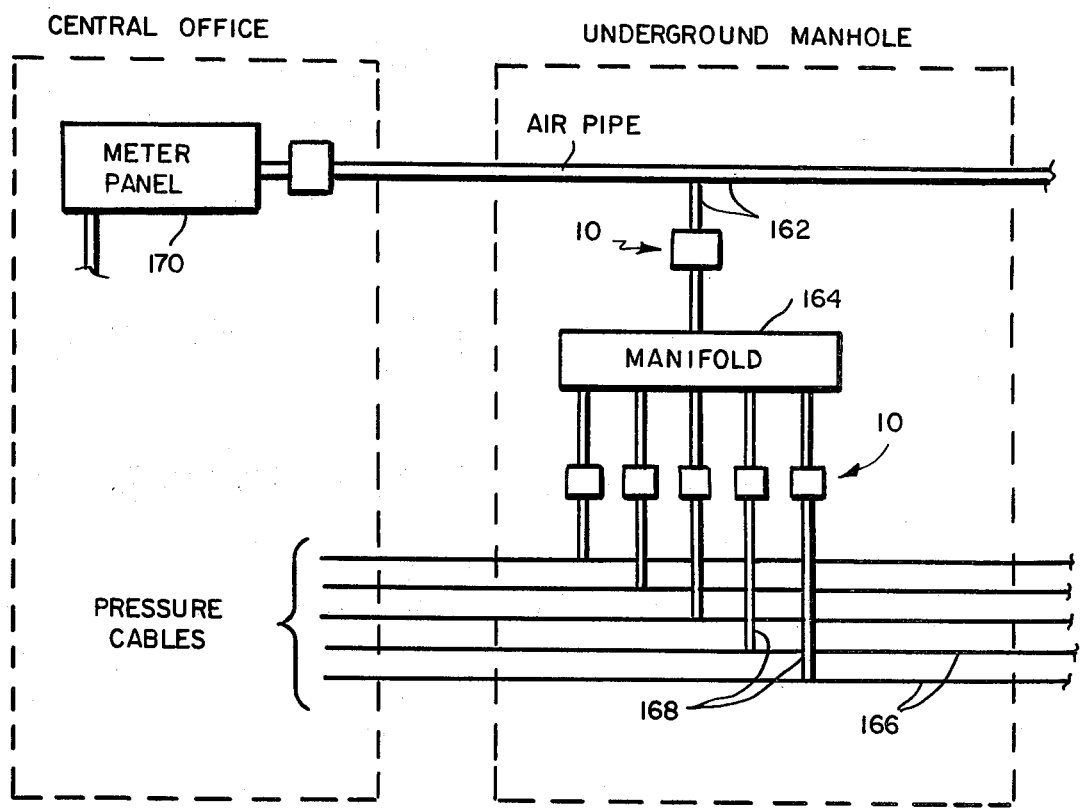
Figure 11:
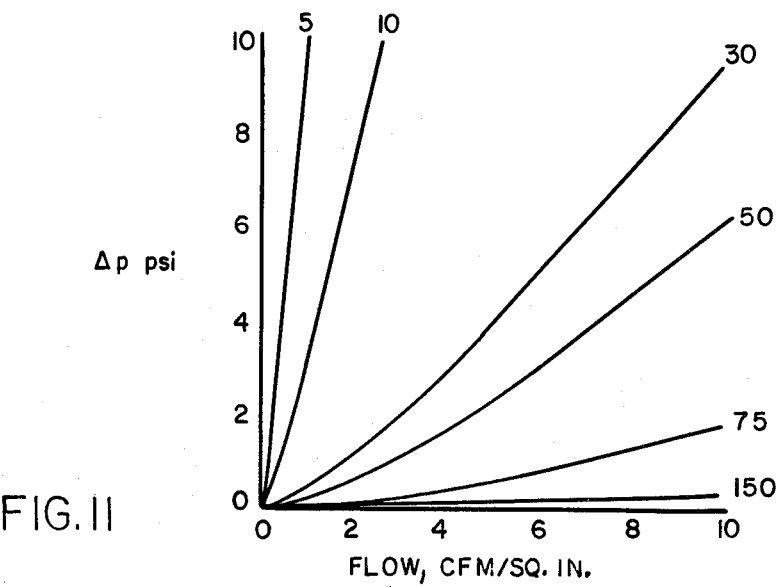

FIG. 10 diagrammatically illustrates the use of the transducer in a typical pressurized system; and FIG. 11 is a graph of the flow characteristics of the linear flow restrictor.

Referring to the drawings, FIGS. 1 to 3, the transducer comprises generally a casting 10 within which there is mounted diaphragm means 12, FIG. 4, displaceable therein in response to a pressure differential at its opposite sides, circuit means 14, FIG. 7, embodying a plurality of unit resistances adapted to be added to or removed from the circuit by movement of a contact arm along the bank of terminals and kinematic means 16, FIG. 4, operably connecting the diaphragm to the contact arm of the circuitry to move the contact arm along the bank of terminals in response to the displacement of the diaphragm.

The casting 10 is of generally rectangular configuration comprising a standing receptacle having top, bottom and side walls 18, 20 and 22, a back wall 24, and a supporting base 26 containing bolt openings 28 by means of which the instrument may be installed for use. The front side of the receptacle is open and is provided with a removable cover plate 30. The interior of the receptacle is of generally circular vertical section and there are openings in the casting in communication with the interior as will be described hereinafter.

The diaphragm means 12, FIG. 4, comprises a flexible element 32 of circular configuration attached to one side of a rigid metal disk or cup 34, the diameter of which is less than the inside diameter of the interior. The flexible member 32 is of larger diameter than the rigid disk so that a portion of the flexible member marginally of the disk extends beyond the peripheral edge of the disk and the assembly comprising the flexible member and disk is mounted at the open side of the receptacle within the interior by means of the cover plate 30 with a peripheral portion of the flexible member sandwiched between the face of the open side of the receptacle, and the marginal edge of the cover plate 30. A gasket 36 is applied to the marginal portion of the flexible member to insure a leak-tight joint. To allow for adequate movement of the diaphragm means, the metal disk 34 is provided with a peripheral, substantially right angularly disposed flange 38 and the flexible member 32 is made of sufficiently large diameter so that a fold 40 in the flexible member is situated and constrained within the annular space between the peripheral flange 38 and the interior surface of the receptacle. The central portion of the cover plate 30 is displaced outwardly with respect to its attaching flange so that its interior surface 42 is spaced from the plane of the diaphragm means and provides in conjunction therewith an interior chamber 44 at the outer side of the diaphragm means which constitutes a high pressure chamber. That portion of the interior of the receptacle at the inner side of the diaphragm defined by the inner side of the diaphragm and the inner side of the back wall 24 constitutes a low pressure chamber 46. The high and low pressure chambers are sealed from each other by the marginal edge of the diaphragm means and the gasket which are clamped between the open face of the receptacle and the cover plate 30.

The circuitry 14 comprises, as shown in FIGS. 6 and 7, a panel 48 of insulative material fastened by means of screws 50 to lugs 52 provided at the interior and comprising part of the casting. The panel 48 has on the surface next to the back wall 24 a printed circuit of the kind disclosed in U.S. Pat. No. 3,283,283 wherein there is a bank of terminals 54 of arcuate configuration, FIG. 7, and a contact carrying arm 56 pivotally mounted on the panel by means of a post 58 for arcuate movement of the distal end 60 of the arm along the bank of terminals. The contacts, of which there are two, are slender spring fingers 59—59 soldered to the distal end of the arm. The free ends of the fingers are bent to provide smooth convex surfaces 61 for engagement with the band of terminals and the latter, as disclosed in the aforesaid patent, are substantially flush with the surface of the panel and comprised of rubidium or its equivalent. Such arcuate movement of the arm in one direction adds unit resistances to the circuit and in the other direction subtracts unit resistances from the circuit. An integral, angularly disposed actuator 62 at the proximal end of the arm provides for moving the actuator arm about its pivot. Since the aforesaid circuitry is described in the applications referred to, the specifics of its construction are not deemed necessary to be described herein.

The kinematic means 16 by means of which the movement of the diaphragm is transmitted to the actuator of the contact arm comprises, as illustrated in FIGS. 4 and 6, a lever arm or bar 64 flexibly supported at one end in a substantially parallel diametral relation to the diaphragm means by a clamp 66 at that end, the latter, in turn, being clamped to one end of a leaf spring 68, the other end of which is rigidly fastened by a block 70 and screw bolts 72 to a shoulder 74 at the interior side of the receptacle and, as thus supported, the lever arm 64 is free to flex at its proximal end with respect to the diaphragm means. At the center of the diaphragm means, there is secured a bearing element 76 containing a conical recess 78 within which there is seated the conical end 80 of a fulcrum member 82, FIG. 8. The distal end of the fulcrum member 82 is diametrically slotted to receive the lever arm 64 and the latter is pivotally connected thereto by a pivot pin 86. As thus arranged, displacement of the diaphragm member will be transmitted to the lever arm 64 through the fulcrum member 82.

At the distal end of the lever arm 24, there is mounted within the receptacle a cylindrical part 88 to the cylindrical surface of which there are fixed in angularly spaced relation radially extending pins 90 and 92, the angular relation of the pins being substantially 90 degrees apart. The pin 90 bears against the distal end of the lever 64. An opening 96 is provided in the panel through which the pin 92 extends into engagement with the distal end of the actuator so as to provide a direct connection between the lever arm and the actuator such that pivotal movement of the lever arm will effect movement of the actuator and, hence, pivotal movement of the contact arm. The cylindrical part 88 is mounted at one end of a span-adjusting spindle 98 threaded within a nipple 100 which, in turn, is threaded within an opening 102 in the top wall 18 of the receptacle. The spindle 98 has at its outer end a slotted head 104 for receiving a tool by means of which it may be rotated to move the spindle axially within the nipple and, hence, move the cylindrical part 88 axially within the receptacle. Such axial movement, in turn, moves the pins 90 and 92 relative to the lever arm 64 and the actuator 62, thus increasing the travel of the contact arm or decreasing it as the spindle is adjusted inwardly or outwardly. The span-adjusting spindle provides for increasing or decreasing the range of the instrument and for a controlled loading force throughout the range of adjustment. A coiled spring 106, FIG. 7, connected at one end to the panel and at its other end to the proximal end of the actuator holds the distal end of the actuator yieldably engaged with the pin 92. For adjustment, a spring 108, FIG. 4, is connected at one end to a post 110 fixed near the proximal end of the lever arm 64 to the clamp block 66. The other end of the spring is connected to an adjustably threaded plug 112 screwed into an opening 114 in the top wall 18 of the receptacle. The zero-adjusting plug 112 is provided with a slotted head 116 by means of which it may be manipulated to increase or decrease the tension in the spring 110. Thus, it is apparent that the zero adjustment and span adjustment are independent, that is, the span can be adjusted without affecting the zero adjustment.

Both the span-adjusting spindle 98 and the zero-adjusting plug 112 are located in the top wall, FIG. 3, in close proximity and are accessible from the same side and outside the instrument.

The flow to be measured is introduced to the transducer to the high and low pressure chambers through ports 118 and 120, FIGS. 5 and 6, provided in the side wall of the receptacle, the said ports being defined by a threaded opening 122 in the side wall which extends through the side wall into the interior of the receptacle within the low pressure chamber and a lateral passage 124 within the wall of the casting from the opening 122 to the high pressure chamber. At the entrances of the opening 120 into the low pressure chamber, there is an annular shoulder 126. A linear flow restrictor 128 in the form of a flat, circular disk of predetermined porosity is held across the inner end of the opening 120 against the shoulder 126 by a threaded bushing member 130 which is screwed into the threaded opening 122. The threaded bushing member 130 contains an axial opening 131 for receiving a coupling element 132 for connecting the transducer to the source of air flow which is to be measured. At the inner end of the bushing member, there are radial openings 134 located at the upstream side of the restrictor 128 so that air entering through the coupling element 132 and through the bushing flows freely and unimpeded into the high pressure chamber without diminution. Flow of air through the coupling element, bushing and restrictor 128 into the low pressure chamber 46 is diminished by resistance of the restrictor 128 to such a flow. The restrictor 128 is designed to be linearly increasingly resistant to the flow of air therethrough in proportion to the increase in flow. By this arrangement, a differential in pressure between the high and low pressure chambers is produced which increases in proportion to the increase in flow of air. Desirably, there is a filter 136 located between the inner end of the opening 131 and the inner end of the coupling element, the porosity of which is such as not to appreciably affect the flow, but solely for the purpose of preventing entrance of dirt and foreign matter to the transducer. Suitable gasket elements 140, 142 and 144 are provided to insure a leak-tight connection.

At the opposite side of the transducer, there is threaded into the side wall into an appropriately threaded opening 145 in communication with the low pressure chamber an outlet nipple 146.

The circuitry wiring indicated generally at 148 is conducted to the exterior of the receptacle through a nipple 160 threaded into the side wall of the receptacle in an appropriately threaded opening 161 which is in communication with the interior of the receptacle.

The transducer described may be used to detect leaks in pressurized telephone cables in a pressurized system such as diagrammatically illustrated in FIG. 10. A transducer, as indicated at 10 in that Figure, is installed in the feeder pipe 162 by means of which pressure is supplied to a manifold 164 which, in turn, is connected to two or more pressurized cables 166 by a corresponding number of conductors 168, each of which contains a transducer 10. Any change in pressure within the pressurized cables is monitored by the transducers 10 in the secondary conductor 168 and transmitted by the feeder pipe 162 to the pipe alarm meter panel 170 at the central office. In operation, a change in pressure and, consequently, flow of air through the pressurized cable will effect a correspondingly proportional change in the differential pressure within the transducer moving the diaphragm forwardly or rearwardly therein. Such movement is reflected by a proportionate movement of the lever arm 64 and, in turn, the contact-carrying arm 56 so as to move the distal end of the latter along the bank of terminals 54 and either add unit resistances or subtract unit resistances from the electrical circuit. The change in resistance in the circuit is reflected by a suitable visual or audible signal. The zero adjustment and range or span of the operation is controlled by adjustment of the zero adjustment screw 112 and spindle 98. The linear flow resistor is manufactured by Sintered Specialties, 1405 Riverside St., Janesville, Wis. 53545, a subsidiary of the Parker Pen Company, and are available in various thicknesses and diameters. The flow characteristics of transducers such as are used herein are illustrated in FIG. 11.

The transducer is described in its capacity for use in monitoring a pressurized telephone cable system; however, it is desirable to detect a pressure change and can be used as independent units or ganged.

It should be understood that the present disclosure is for the purpose of illustration only and includes all modifications or improvements which fall within the scope of the appended claims.

I claim:

1. A device for measuring air flow comprising a housing defining a receptacle, displaceable means in the receptacle dividing the receptacle into a high pressure chamber at one side and a low pressure chamber at the other side, means defining an opening in the housing providing a port in communication with the high pressure chamber and a port in communication with the low pressure chamber, said port in communiwith the high pressure chamber being upstream of the port in communication with the low pressure chamber, means in said opening upstream of the port in communication with the low pressure chamber and downstream of the port in communication with the high pressure chamber for creating a pressure differential in the two chambers which is directly proportional to any change in pressure such that the displaceable member is displaced in an amount which is directly proportional to said change in pressure and kinematic means operable by the displacement of the displaceable member to produce a signal of predetermined magnitude.

2. A device according to claim 1 comprising a coupling element threaded into the opening containing an axial passage and a radial passage in communication, respectively, with the low pressure chamber and the high pressure chamber, said coupling being adapted to receive the end of the conductor of the air flow to be measured.

3. A device according to claim 1 wherein the low pressure chamber contains an exhaust port, 4. A device according to claim 1 wherein the means means for creating a pressure differential is a linear flow restrictor.

5. A device according to claim 1 wherein said means for creating a pressure differential is a disk of predetermined porosity comprised of sintered stainless steel powdered metal.

6. A device according to claim 1 wherein the means for creating a pressure differential is a porous element comprised of sintered stainless steel powdered metal approximately ½ of an inch in diameter and 1/16 of an inch in thickness.

7. A device for detecting a change in air flow comprising high and low pressure chambers with a displaceable member therebetween, means defining an inlet port in communication with the low pressure chamber, means defining a lateral passage therefrom in communication with the high pressure chamber, means in the inlet port downstream of the lateral passage at the entrance to the low pressure chamber through which air entering the low pressure chamber must pass, said means operating to change the flow rate through it into the low pressure chamber in inverse proportion to the rate of the air at the upstream side such that there is a pressure differential between the high and low pressure chambers which is inversely proportional to a change in the rate of flow at the inlet port, said displaceable member being displaceable in proportion to said differential pressure and kinematic means located in the low pressure chamber operably connected to the displaceable member, operable by displacement to produce a signal of predetermined magnitude.

8. A device according to claim 1 wherein said displaceable member includes a flexible diaphragm.

9. A device according to claim 1 wherein displaceable member is a rigid plate and a flexible diaphragm, the peripheral edge of which supports the rigid plate for displacement.

10. A device according to claim 1 wherein the means for producing a signal comprises an electrical circuit capable of alteration and kinematic means operable by the displaceable member to effect alteration of the electrical circuit.

11. A device according to claim 1 wherein the means for producing the signal comprises an electric circuit to which resistance units may be added and removed and kinematic means operable by the displaceable member to effect addition of resistance units to the circuit or removing resistance units therefrom.

12. A device according to claim 10 wherein the electrical circuit includes a nonconductive panel bearing a bank of terminals arranged to be added to and removed from the circuit, and an arm arranged to be moved along the bank of terminals by said kinematic means.

13. A device according to claim 12 wherein there are resilient contact elements at the distal end of the arm which have rubbing contact with the terminals of the bank of terminals as the arm is moved along said bank of terminals.

14. A device according to claim 10 wherein the kinematic means comprises a lever, means flexibly supporting the lever at one end substantially parallel to the displaceable means so that it extends diametrically across the displaceable member, means supported by the displaceable means and movable therewith in engagement with said lever for moving the distal end of the lever in response to the displacement of the displaceable member, and means movable in response to the movement of the distal end of the lever to effect movement of said means for altering the resistance in the electrical circuit.

15. A device according to claim 14 wherein there is means for adjusting the position of said last-named means along the lever.

16. A device according to claim 14 wherein said kinematic means comprises a part rotatable about an axis parallel to the diaphragm and angularly disposed pins fixed thereto for rotation about said axis, said pins being so angularly disposed that the distal end of one bears against the distal end of the lever and the distal end of the other affects movement of the means for altering the resistance in the circuit.

17. A device according to claim 16 wherein said part is movable axially to change the place of engagement of the pin having contact with the lever relative to the proximal end thereof.

18. A device according to claim 16 wherein the means for altering the resistance in the circuit comprises a carrier arranged for pivotal movement about an axis perpendicular to the diaphragm and wherein said other pin bears against the carrier.

19. A device according to claim 18 wherein there is spring means yieldably holding the carrier in engagement with said other pin such that movement of said other pin effects movement of the carrier.

20. A device according to claim 19 comprising means for adjusting the resistance to displacement of the lever.

21. A device according to claim 14 comprising a post fixed at one end to the lever adjacent to but spaced from the proximal end thereof, perpendicular to said lever, and spring means connected in tension to the distal end of the post to apply a resistance to displacement of the lever by displacement of the diaphragm.

22. A device according to claim 12 comprising means for adjusting the zero position of the arm and means for adjusting the extent of travel of the arm.

23. A device according to claim 1 wherein said means in the inlet port is a linear flow restrictor.

24. A device according to claim 23 wherein said linear flow restrictor permits flow therethrough which is inversely proportional to its thickness.

25. In a device for measuring air flow, a part which is displaceable in an amount which is directly proportional to a change in air pressure, a lever, means supporting the lever at one end for pivotal movement with a portion intermediate its ends in engagement with said displaceable part such that movement of said displaceable part will effect pivotal movement of the lever, a spindle supported at the distal end of the lever in parallel relation thereto for adjustment along its axis, angularly spaced radial arms fixed to the spindle, one of which has engagement with the distal end of the lever, a scale of predetermined length, a pointer movable along said scale, said other radial arm having engagement with the pointer such that pivotal movement of the lever effects movement of the pointer along the scale, and adjustment of the axial position of the spindle changes the range of movement of the pointer along the scale, and means connected to the proximal end of the lever for adjusting the initial position thereof for zero position of the pointer.

26. A device according to claim 25 wherein the means for adjusting the spindle by changing the range of movement of the pointer along the scale is adjustable independently of the means for adjusting the zero position of the lever and of the pointer relative to the scale.

27. A device according to claim 1 comprising a filter element in said opening upstream of the radial passage.

* * * * *